(12) United States Patent  
Thomas

(10) Patent No.: US 6,450,464 B1  
(45) Date of Patent: Sep. 17, 2002

(54) SATELLITE DISH STAND

(76) Inventor: Elbert Lee Thomas, P.O. Box 300891, Escondido, CA (US) 92030

( * ) Notice: Subject to any disclaimer, the term of this patent is extended or adjusted under 35 U.S.C. 154(b) by 0 days.

(21) Appl. No.: 09/759,066

(22) Filed: Jan. 12, 2001

(51) Int. Cl.⁷ ............................................. F16M 11/38
(52) U.S. Cl. ................. 248/168; 248/163.1; 248/177.1; 248/166; 248/431; 248/435; 343/878; 343/906
(58) Field of Search .......................... 248/177.1, 163.1, 248/166, 431, 435, 168; 343/878, 906

(56) References Cited

U.S. PATENT DOCUMENTS

| 2,194,800 A | * | 3/1940 | Ley .............................. 24/243 |
| 2,579,348 A | * | 12/1951 | Taylor ........................ 248/178 |
| 2,794,612 A | * | 6/1957 | Clifton ........................ 248/161 |
| 3,051,425 A | * | 8/1962 | Homrighausen ............ 248/168 |
| D263,147 S | | 2/1982 | Iwasaki |
| 4,630,626 A | * | 12/1986 | Urban ........................ 135/84 |
| 4,886,230 A | | 12/1989 | Jones et al. |
| 4,988,064 A | * | 1/1991 | Hoshino .................... 248/17 D |
| 5,308,029 A | * | 5/1994 | Bingham ..................... 248/159 |
| 5,359,461 A | * | 10/1994 | Rice et al. ................... 359/874 |
| 5,435,509 A | * | 7/1995 | Bingham ..................... 248/159 |
| 5,505,415 A | | 4/1996 | Brett |
| 5,526,010 A | | 6/1996 | Plunk |
| 5,614,918 A | | 3/1997 | Dinardo et al. |
| 5,660,366 A | | 8/1997 | Palmer |
| 5,769,370 A | * | 6/1998 | Ashjaee .................... 248/181.1 |
| 6,084,549 A | * | 7/2000 | Pensjo et al. ............... 343/702 |
| 6,092,770 A | * | 7/2000 | Battocchio .................. 248/171 |

* cited by examiner

Primary Examiner—Leslie A. Braun  
Assistant Examiner—Steven Marsh

(57) ABSTRACT

A satellite dish stand for providing a transportable stabile base for mounting a satellite dish. The satellite dish stand includes a pipe member with a lumen extending between an upper end and a lower end such that the upper end is designed for receiving a post of a satellite dish, an upper collar fixedly coupled to the pipe member, a lower collar coupled to the pipe member, a plurality of leg members each with an upper portion coupled to the upper collar, and a plurality of leg support struts coupled to extend between the lower collar and an associated one of the leg members.

9 Claims, 3 Drawing Sheets

SATELLITE DISH STAND

BACKGROUND OF THE INVENTION

1. Field of the Invention

The present invention relates to portable stands and more particularly pertains to a new satellite dish stand for providing a transportable stabile base for mounting a satellite dish.

2. Description of the Prior Art

The use of portable stands is known in the prior art. More specifically, portable stands heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,660,366; U.S. Pat. No. 5,614,918; U.S. Pat. No. 4,886,230; U.S. Pat. No. Des. 263,147; U.S. Pat. No. 5,505,415; and U.S. Pat. No. 5,526,010.

While these devices fulfill their respective, particular objectives and requirements, the aforementioned patents do not disclose a new satellite dish stand. The inventive device includes a pipe member with a lumen extending between an upper end and a lower end such that the upper end is designed for receiving a post of a satellite dish, an upper collar fixedly coupled to the pipe member, a lower collar coupled to the pipe member, a plurality of leg members each with an upper portion coupled to the upper collar, and a plurality of leg support struts coupled to extend between the lower collar and an associated one of the leg members In these respects, the satellite dish stand according to the present invention substantially departs from the conventional concepts and designs of the prior art, and in so doing provides an apparatus primarily developed for the purpose of providing a transportable stabile base for mounting a satellite dish.

SUMMARY OF THE INVENTION

In view of the foregoing disadvantages inherent in the known types of portable stands now present in the prior art, the present invention provides a new satellite dish stand construction wherein the same can be utilized for providing a transportable stabile base for mounting a satellite dish.

The general purpose of the present invention, which will be described subsequently in greater detail, is to provide a new satellite dish stand apparatus and method which has many of the advantages of the portable stands mentioned heretofore and many novel features that result in a new satellite dish stand which is not anticipated, rendered obvious, suggested, or even implied by any of the prior art portable stands, either alone or in any combination thereof.

To attain this, the present invention generally comprises a pipe member with a lumen extending between an upper end and a lower end such that the upper end is designed for receiving a post of a satellite dish, an upper collar fixedly coupled to the pipe member, a lower collar coupled to the pipe member, a plurality of leg members each with an upper portion coupled to the upper collar, and a plurality of leg support struts coupled to extend between the lower collar and an associated one of the leg members There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new satellite dish stand apparatus and method which has many of the advantages of the portable stands mentioned heretofore and many novel features that result in a new satellite dish stand which is not anticipated, rendered obvious, suggested, or even implied by any of the prior art portable stands, either alone or in any combination thereof.

It is another object of the present invention to provide a new satellite dish stand which may be easily and efficiently manufactured and marketed.

It is a further object of the present invention to provide a new satellite dish stand which is of a durable and reliable construction.

An even further object of the present invention is to provide a new satellite dish stand which is susceptible of a low cost of manufacture with regard to both materials and labor, and which accordingly is then susceptible of low prices of sale to the consuming public, thereby making such satellite dish stand economically available to the buying public.

Still yet another object of the present invention is to provide a new satellite dish stand which provides in the apparatuses and methods of the prior art some of the advantages thereof, while simultaneously overcoming some of the disadvantages normally associated therewith.

Still another object of the present invention is to provide a new satellite dish stand for providing a transportable stabile base for mounting a satellite dish.

Yet another object of the present invention is to provide a new satellite dish stand which includes a pipe member with a lumen extending between an upper end and a lower end such that the upper end is designed for receiving a post of a satellite dish, an upper collar fixedly coupled to the pipe member, a lower collar coupled to the pipe member, a plurality of leg members each with an upper portion coupled to the upper collar, and a plurality of leg support struts coupled to extend between the lower collar and an associated one of the leg members Still yet another object of the present invention is to provide a new satellite dish stand that provides portability for satellite dish systems.

Even still another object of the present invention is to provide a new satellite dish stand that eliminates the need to mount a satellite dish to a structure in order to provide a stabile base.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
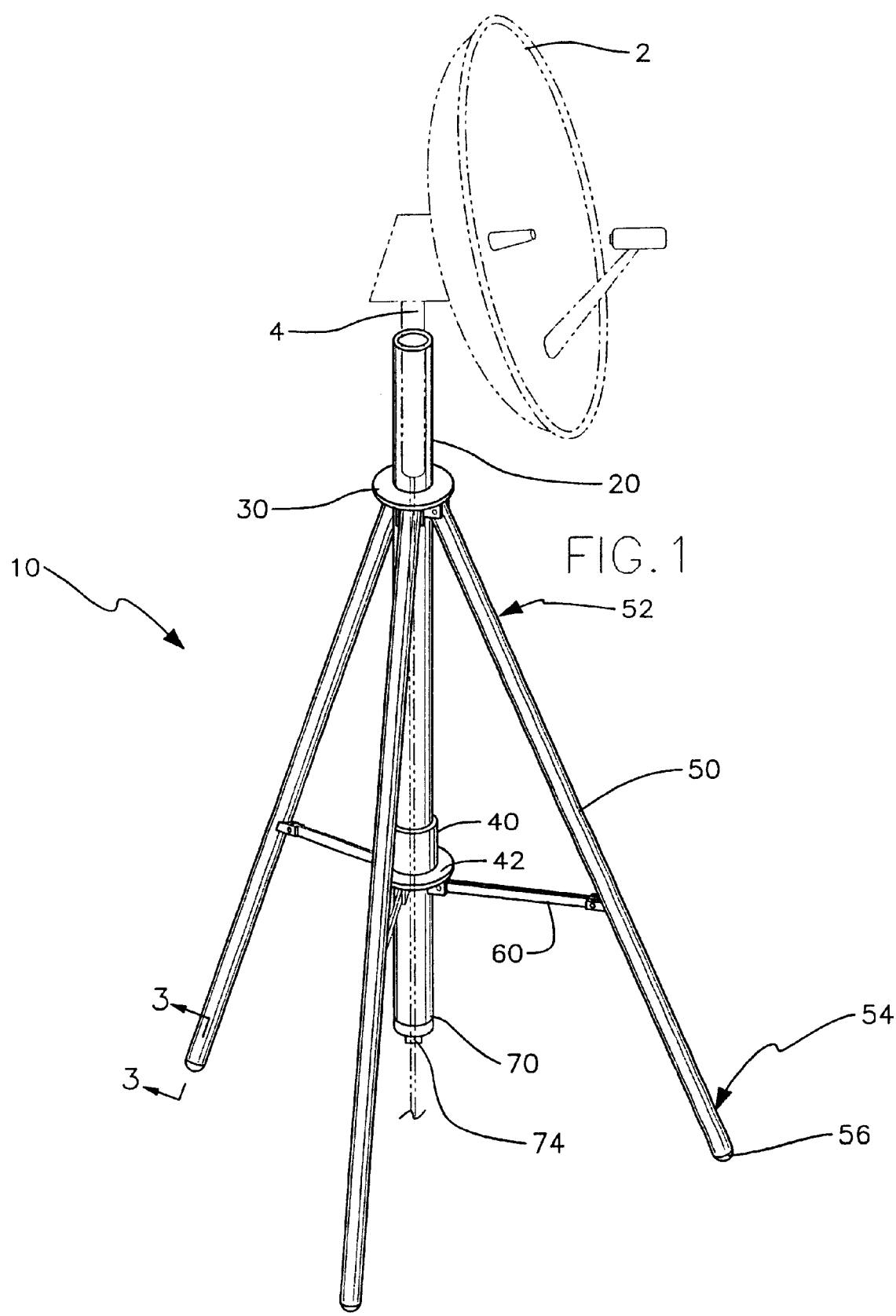
FIG. 1 is a schematic perspective view of a new satellite dish stand according to the present invention.
Figure 2:
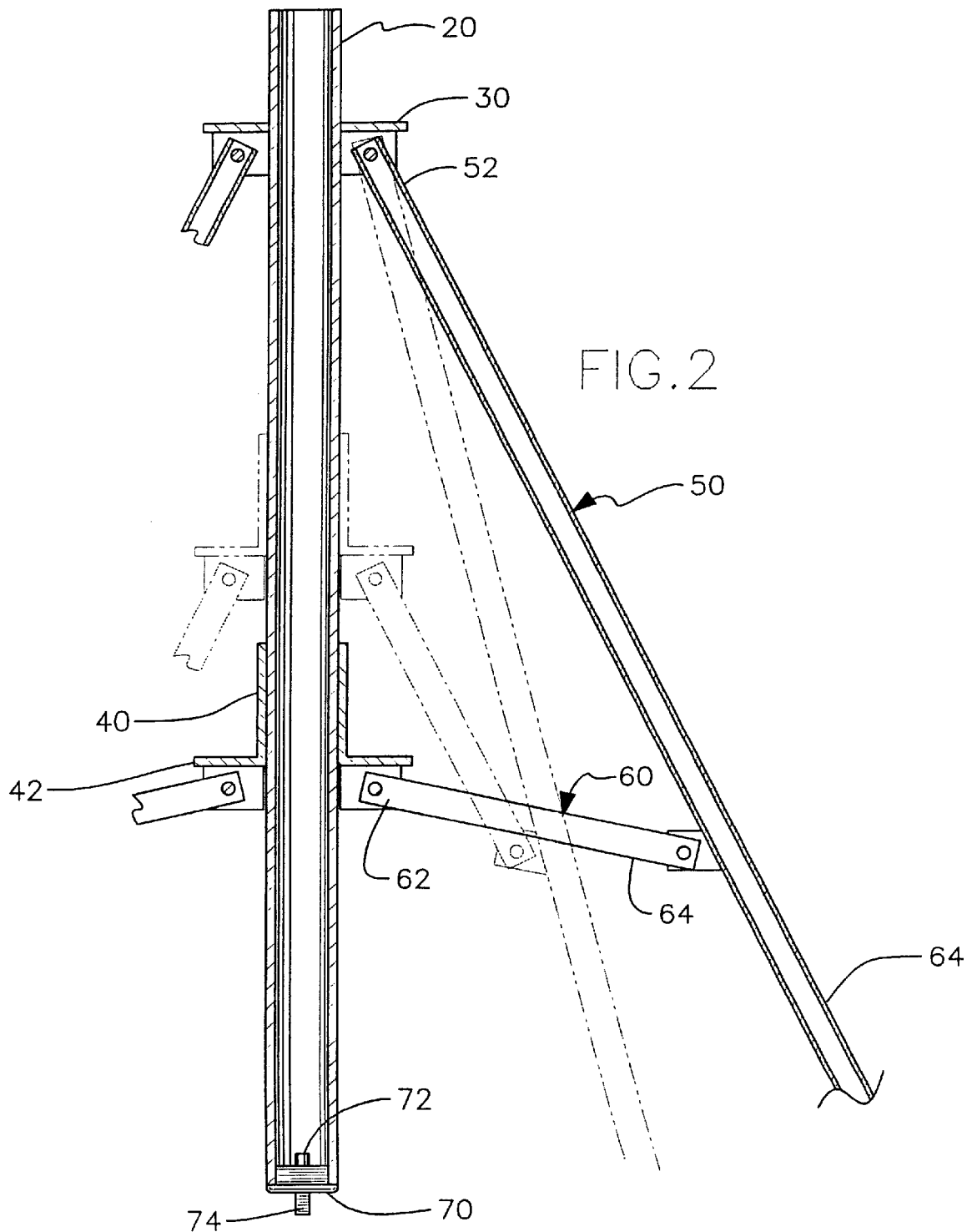
FIG. 2 is a schematic side view of the present invention illustrating the lower collar and leg support struts.
Figure 3:
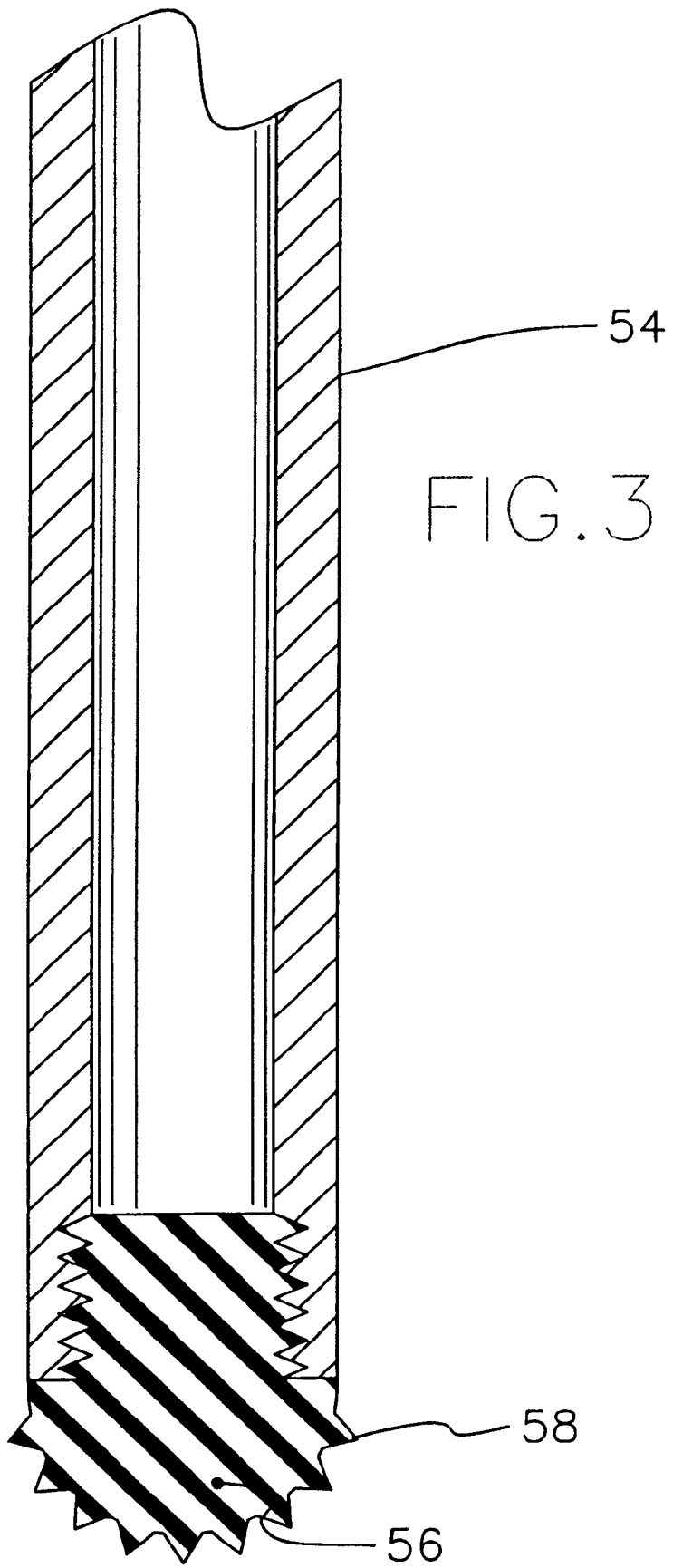
FIG. 3 is a schematic cross-section view of the lower portion of the leg members and foot members of the present invention.

With reference now to the drawings, and in particular to FIGS. 1 through 3 thereof, a new satellite dish stand embodying the principles and concepts of the present invention and generally designated by the reference numeral 10 will be described.

As best illustrated in FIGS. 1 through 3, the satellite dish stand 10 generally comprises a pipe member 20, an upper collar 30, a lower collar 40, a plurality of leg members 50, and a plurality of leg support struts 60.

The pipe member 20 includes a lumen, which extends between an upper end of the pipe member 20 and a lower end of the pipe member 20 such that the upper end is designed for receiving a post 4 of a satellite dish 2.

The upper collar 30 is fixedly coupled to the pipe member 20. The lower collar 40 is also coupled to the pipe member 20.

Each leg member 50 includes an upper portion 52 coupled to the upper collar 30. Each of the leg members 50 is telescopic.

Each of the leg support struts 60 is coupled to extend between the lower collar member 40 and an associated one of the leg members 50. Thus the leg members 50 are positioned to support the pipe member 20 in an upright position.

The upper collar 30 is fixed in position relative to the pipe member 20. The lower collar 40 is slidably coupled to the pipe member 20. The upper portion 52 of each leg member 50 is pivotally coupled to the upper collar 30.

A first end 62 of each of the leg support struts 60 is pivotally coupled to the lower collar 40 and a second end 64 of each of the leg support struts 60 is pivotally coupled to an associated one of the leg members 50. Thus each leg member 50 pivots relative to the upper collar 30 when the lower collar 40 slides along the pipe member 20.

Each of the leg support struts 60 is inelastic. Thus the leg members 50 are held in a spread position when the lower collar 40 is positioned on the pipe member 20 such that one of the leg support struts 60 is positioned to extend away from the lower collar 40 orthogonally with respect to the pipe member 20.

The lower collar 40 includes an annular lip portion 42 positioned to extend outwardly relative to the pipe member 20. The lip portion 42 is positioned adjacent to the first ends 62 of the leg support struts 60 such that the leg support struts 60 contact the lip portion 42 when the lower collar 40 is in a fully extended position. Thus the lip portion 42 prevents the leg support struts 60 from pivoting in a first direction for preventing the lower collar 40 from sliding past the fully extended position.

An end member 70 is couplable to the lower end of the pipe member 20. The end member 70 includes an upper connection portion 72. The upper connection portion 72 is positioned inside the lumen when the end member 70 is coupled to the lower end of the pipe member 20. The upper connection portion 72 is designed for coupling to a satellite dish connection cable.

The end member 70 includes a lower connection portion 74. The lower connection portion 74 is positioned to extend from the lower end of the pipe member 20 when the end member 70 is coupled to the lower end of the pipe member 20. The lower connection portion 74 is designed for coupling to a coaxial cable. The lower connection portion 74 is in communication with the upper connection portion 72. Thus the end member 70 is designed for transmitting a signal from the satellite dish connection cable to the coaxial cable.

Each of the leg members 50 includes a telescopic lower portion 54. Each of a plurality of foot members 56 is coupled to a distal end of an associated one of the telescopic lower portions 54 of the leg member 50 such that each the foot member 56 is designed for engaging a ground surface.

Each of the foot members 56 includes a plurality of protrusions 58. Each of the protrusions 58 is designed for engaging the ground surface for preventing movement of the foot member 56 along the ground surface. Each foot member 56 includes an arcuate outer surface for facilitating engagement of the foot member 56 with the ground surface.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A satellite dish stand assembly comprising:
   a pipe member having a lumen extending between an upper end of said pipe member and a lower end of said pipe member such that said upper end is adapted for receiving a post of a satellite dish;
   an upper collar fixedly coupled to said pipe member;
   a plurality of leg members, each leg member having an upper portion coupled to said upper collar;
   a lower collar coupled to said pipe member;
   a plurality of leg support struts, each of said leg support struts being coupled to extend between said lower collar member and an associated one of said leg members whereby said leg members are positioned to support said pipe member in an upright position;
   an end member couplable to said lower end of said pipe member;
   said end member having an upper connection portion, said upper connection portion being positioned inside said lumen when said end member is coupled to said lower end of said pipe member, said upper connection portion being adapted for coupling to a satellite dish connection cable;
   said end member having a lower connection portion, said lower connection portion being positioned to extend from said lower end of said pipe member when said end member is coupled to said lower end of said pipe member, said lower connection portion being adapted for coupling to a coaxial cable; and
   said lower connection portion being in communication with said upper connection portion whereby said end member is adapted for transmitting a signal from the satellite dish connection cable to the coaxial cable.

2. The satellite dish stand assembly of claim 1, further comprising:
   each of said leg members being telescopic.

3. The satellite dish stand assembly of claim 1, further comprising:
   said upper collar being fixed in position relative to said pipe member;
   said lower collar being slidably coupled to said pipe member; and
   said upper portion of each leg member being pivotally coupled to said upper collar; and
   a first end of each of said leg support struts being pivotally coupled to said lower collar and a second end of each of said leg support struts being pivotally coupled to an associated one of said leg members whereby each leg member pivots relative to said upper collar when said lower collar slides along said pipe member.

4. The satellite dish stand assembly of claim 3, further comprising:
   each of said leg support struts being inelastic whereby said leg members are held in a spread position when said lower collar is positioned on said pipe member such that one of said leg support struts is positioned to extend away from said lower collar orthogonally with respect to said pipe member.

5. The satellite dish stand assembly of claim 3, further comprising:
   said lower collar having an annular lip portion positioned to extend outwardly relative to said pipe member, said lip portion being positioned adjacent to said first ends of said leg support struts such that said leg support struts contact said lip portion when said lower collar is in a fully extended position whereby said lip portion prevents said leg support struts from pivoting in a first direction for preventing said lower collar from sliding past said fully extended position.

6. The satellite dish stand assembly of claim 1, further comprising:
   each of said leg members having a telescopic lower portion;
   a plurality of foot members, each of said foot members being coupled to a distal end of an associated one of said telescopic lower portions of said leg member such that each said foot member is adapted for engaging a ground surface.

7. The satellite dish stand assembly of claim 6, further comprising:
   each of said foot members having a plurality of protrusions, each of said protrusions being adapted for engaging the ground surface for preventing movement of said foot member along the ground surface.

8. The satellite dish stand assembly of claim 6, further comprising:
   each foot member having an arcuate outer surface for facilitating engagement of said foot member with the ground surface.

9. A satellite dish stand assembly comprising:
   a pipe member having a lumen extending between an upper end of said pipe member and a lower end of said pipe member such that said upper end is adapted for receiving a post of a satellite dish;
   an upper collar fixedly coupled to said pipe member;
   a plurality of leg members, each leg member having an upper portion coupled to said upper collar;
   a lower collar coupled to said pipe member;
   a plurality of leg support struts, each of said leg support struts being coupled to extend between said lower collar member and an associated one of said leg members whereby said leg members are positioned to support said pipe member in an upright position;
   each of said leg members being telescopic;
   said upper collar being fixed in position relative to said pipe member;
   said lower collar being slidably coupled to said pipe member;
   said upper portion of each leg member being pivotally coupled to said upper collar;
   a first end of each of said leg support struts being pivotally coupled to said lower collar and a second end of each of said leg support struts being pivotally coupled to an associated one of said leg members whereby each leg member pivots relative to said upper collar when said lower collar slides along said pipe member;
   each of said leg support struts being inelastic whereby said leg members are held in a spread position when said lower collar is positioned on said pipe member such that one of said leg support struts is positioned to extend away from said lower collar orthogonally with respect to said pipe member;
   said lower collar having an annular lip portion positioned to extend outwardly relative to said pipe member, said lip portion being positioned adjacent to said first ends of said leg support struts such that said leg support struts contact said lip portion when said lower collar is in a fully extended position whereby said lip portion prevents said leg support struts from pivoting in a first direction for preventing said lower collar from sliding past said fully extended position;

an end member couplable to said lower end of said pipe member;

said end member having an upper connection portion, said upper connection portion being positioned inside said lumen when said end member is coupled to said lower end of said pipe member, said upper connection portion being adapted for coupling to a satellite dish connection cable;

said end member having a lower connection portion, said lower connection portion being positioned to extend from said lower end of said pipe member when said end member is coupled to said lower end of said pipe member, said lower connection portion being adapted for coupling to a coaxial cable; and said lower connection portion being in communication with said upper connection portion whereby said end member is adapted for transmitting a signal from the satellite dish connection cable to the coaxial cable;

each of said leg members having a telescopic lower portion;

a plurality of foot members, each of said foot members being coupled to a distal end of an associated one of said telescopic lower portions of said leg member such that each said foot member is adapted for engaging a ground surface;

each of said foot members having a plurality of protrusions, each of said protrusions being adapted for engaging the ground surface for preventing movement of said foot member along the ground surface;

each foot member having an arcuate outer surface for facilitating engagement of said foot member with the ground surface.

\* \* \* \* \*